R. ENSIGN.
EXTENSION HAY LOADER.
APPLICATION FILED NOV. 30, 1917.

1,303,644.

Patented May 13, 1919.
5 SHEETS—SHEET 1.

Witness.
E. H. Buchanan.

Inventor
R. Ensign.
By Orwig & Bair ATTYS.

R. ENSIGN.
EXTENSION HAY LOADER.
APPLICATION FILED NOV. 30, 1917.

1,303,644.

Patented May 13, 1919.
5 SHEETS—SHEET 2.

Witness
E. H. Buchanan

Inventor
R. Ensign
By Orwig & Bain ATTYS.

R. ENSIGN.
EXTENSION HAY LOADER.
APPLICATION FILED NOV. 30, 1917.
1,303,644.
Patented May 13, 1919.
5 SHEETS—SHEET 3.
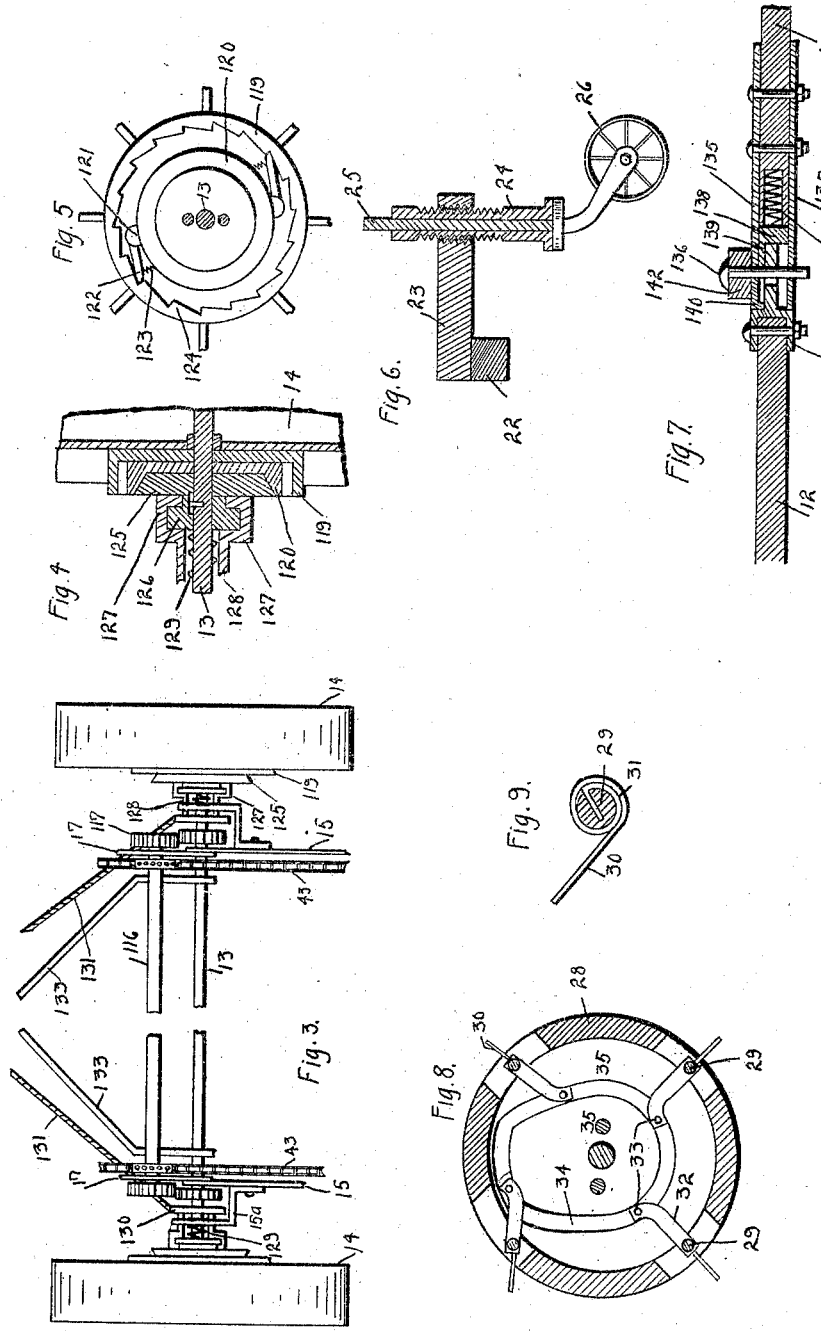
Witness
G. H. Buchanan.
Inventor.
R. Ensign.
By Orwig & Bair
ATTYS.

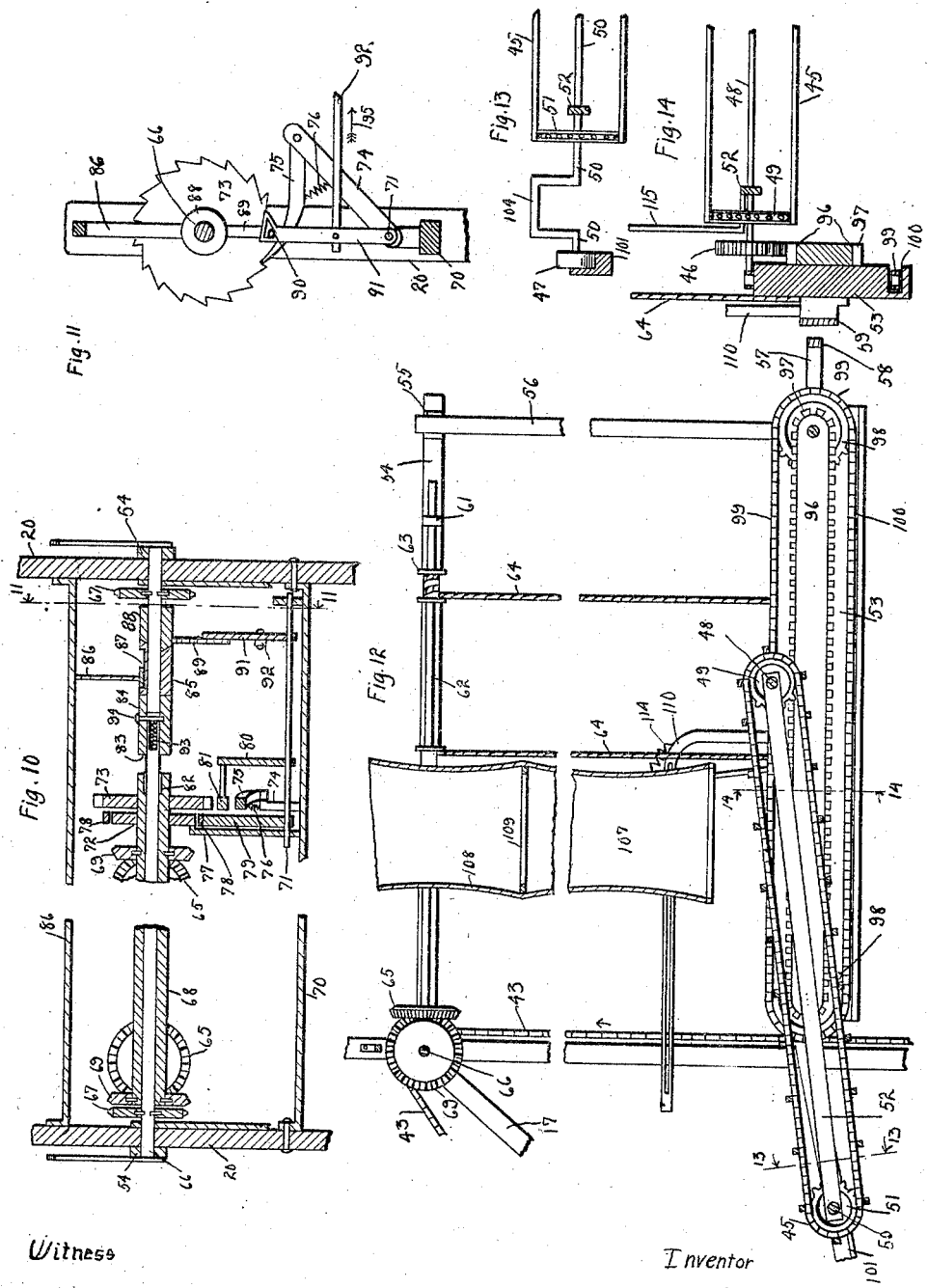

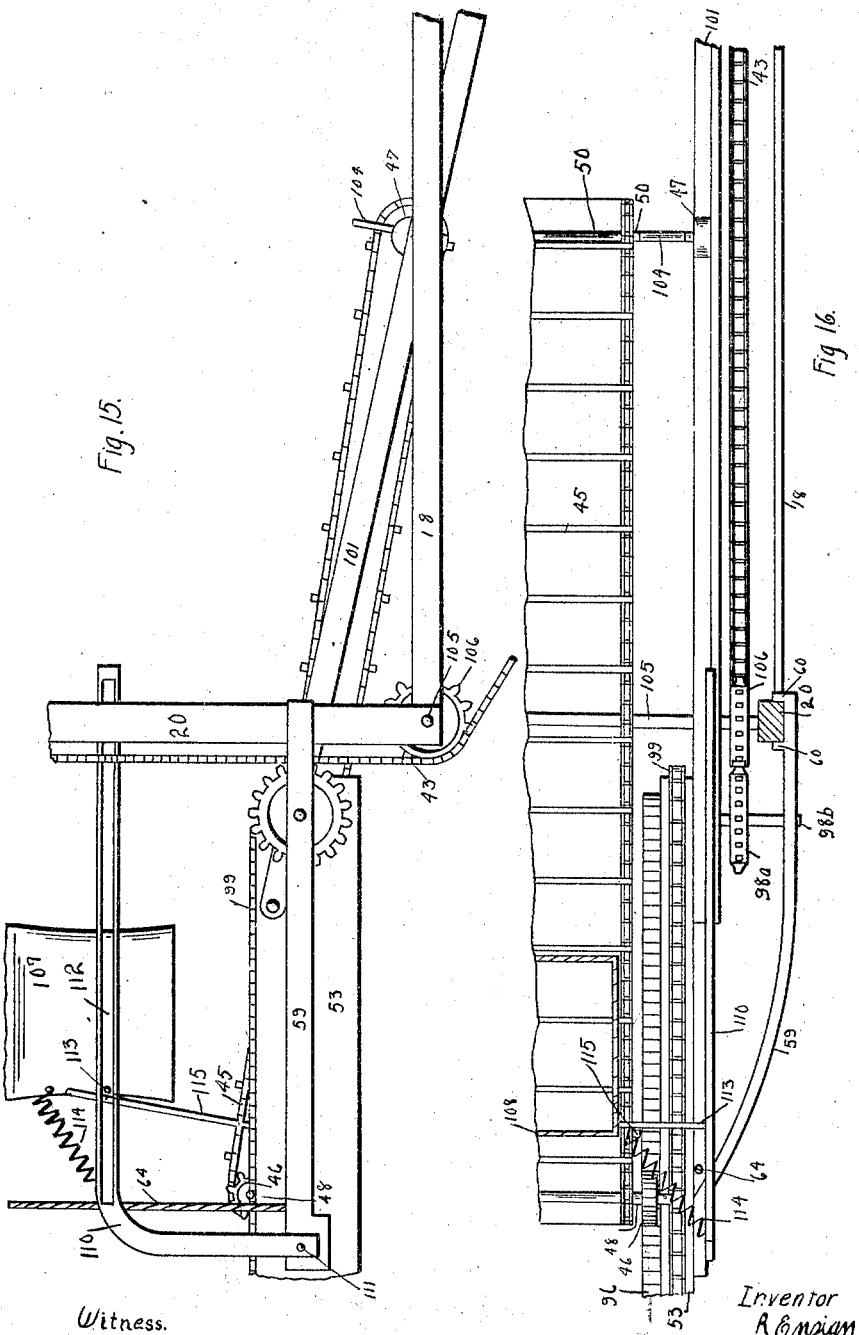

UNITED STATES PATENT OFFICE.

RUSSELL ENSIGN, OF STORM LAKE, IOWA.

EXTENSION HAY-LOADER.

1,303,644.    Specification of Letters Patent.    Patented May 13, 1919.

Application filed November 30, 1917. Serial No. 204,791.

*To all whom it may concern:*

Be it known that I, RUSSELL ENSIGN, a citizen of the United States, and resident of Storm Lake, in the county of Buena Vista and State of Iowa, have invented a certain new and useful Extension Hay-Loader, of which the following is a specification.

The object of my invention is to provide an extension hay loader of simple, durable and inexpensive construction.

A further object of my invention is to provide a loader attachment in the nature of a trailer, which may be readily secured to a hay rack to be driven over the field to thereby load the hay rack.

A further object of my invention is to provide a pair of traction wheels upon which is mounted a frame carrying a combined rake and elevating and distributing mechanism, which may be secured to the rear end of a hay rack.

A further object of my invention is to provide a frame designed to be supported adjacent to the rear end of a hay rack in such position that a rake device may be operated at the rear end of the frame, an elevating device may be operated at the intermediate portions of the frame, and a distributing device may be reciprocated at the forward end of the frame whereby the hay may be evenly distributed upon the rack.

A further object of my invention is to provide means for causing the distributing conveyer to be simultaneously operated and also reciprocated as a whole.

A further object of my invention is to provide an improved track designed to extend beneath the elevating mechanism of a loader to carry the rear end of the distributing conveyer in any of its adjusted positions.

A further object of my invention is to provide means for vertically adjusting the distributing conveyer without affecting its driving connections.

With these and other objects in view, my invention consists in the construction, arrangement and combination of the various parts of my device whereby the objects contemplated are attained, as hereinafter more fully set forth, pointed out in my claims, and illustrated in the accompanying drawings, in which:

Fig. 3 shows a top or plan view of the traction wheels and driving mechanism, the framework and elevating devices being broken away to better illustrate the construction.

Fig. 4 shows a horizontal, central, sectional view through the traction wheel axle and clutch mechanism whereby the axle is connected to the moving part of the loader.

Fig. 5 shows a side elevation of certain parts shown in Fig. 4.

Fig. 6 shows a vertical, sectional view illustrating the construction of the rear supporting wheels of the loader.

Fig. 7 shows a vertical, sectional view illustrating the construction of my improved hitch device.

Fig. 8 shows a vertical, sectional view illustrating in detail the construction of the hay rake.

Fig. 9 shows an enlarged detailed view of one of the teeth of the hay rake.

Fig. 10 shows a vertical, sectional view illustrating the clutch devices whereby the distributing conveyer is elevated and lowered.

Fig. 11 shows a vertical, sectional view taken on the line 11—11 of Fig. 10.

Fig. 12 shows a vertical, sectional view of the distributing conveyer and its operating parts illustrating the construction and operation of the conveyer.

Fig. 13 shows a sectional view taken on the line 13—13 of Fig. 12.

Fig. 14 shows an enlarged vertical, sectional view taken on the line 14—14 of Fig. 12.

Fig. 15 shows a side elevation of a portion of the loader illustrating one position of the distributing conveyer, and Fig. 16 shows an enlarged top or plan view of the parts shown in Fig. 15.

Figure 1:
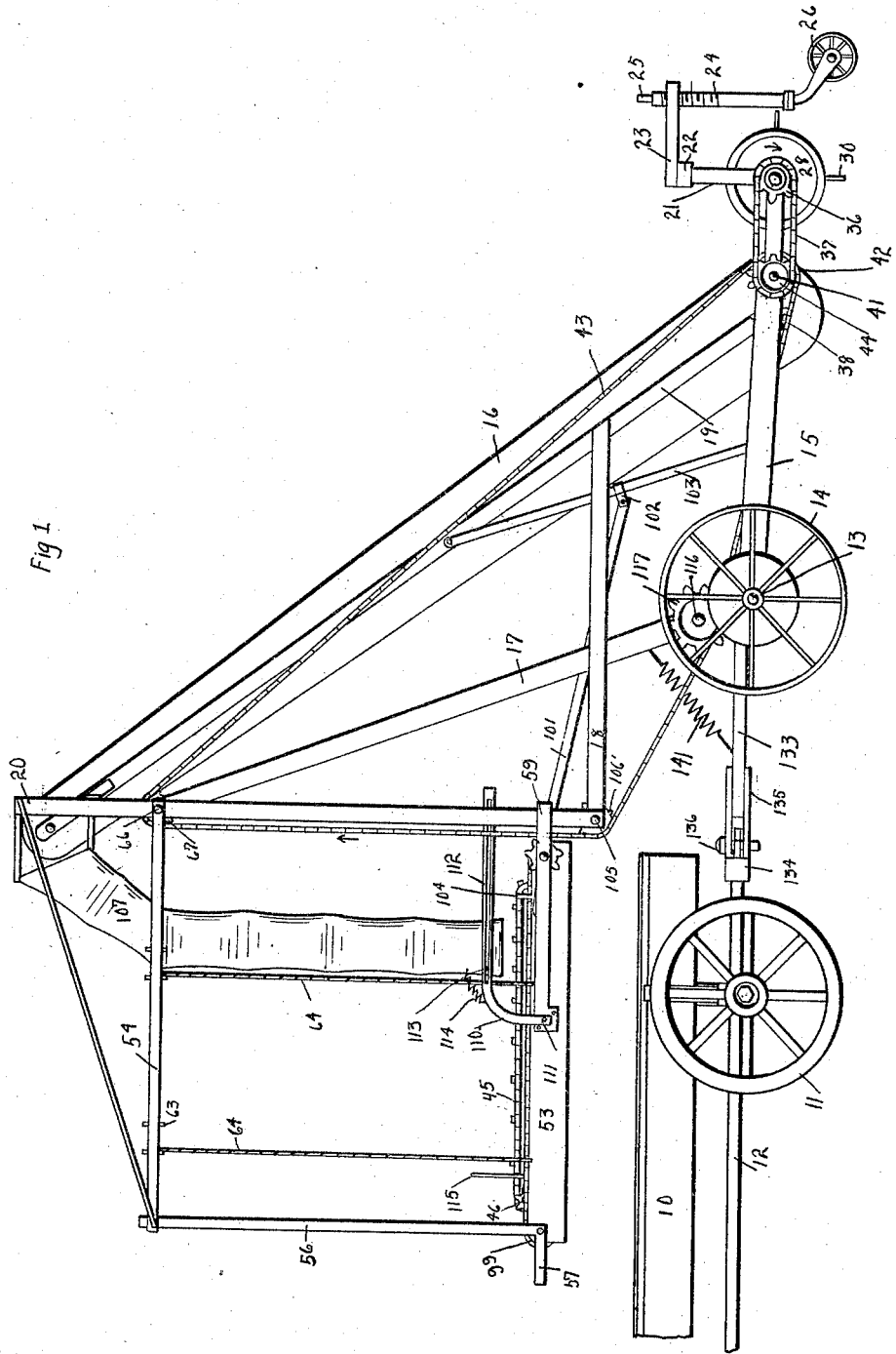
Figure 1 shows a side elevation of my improved hay loader.
Figure 2:
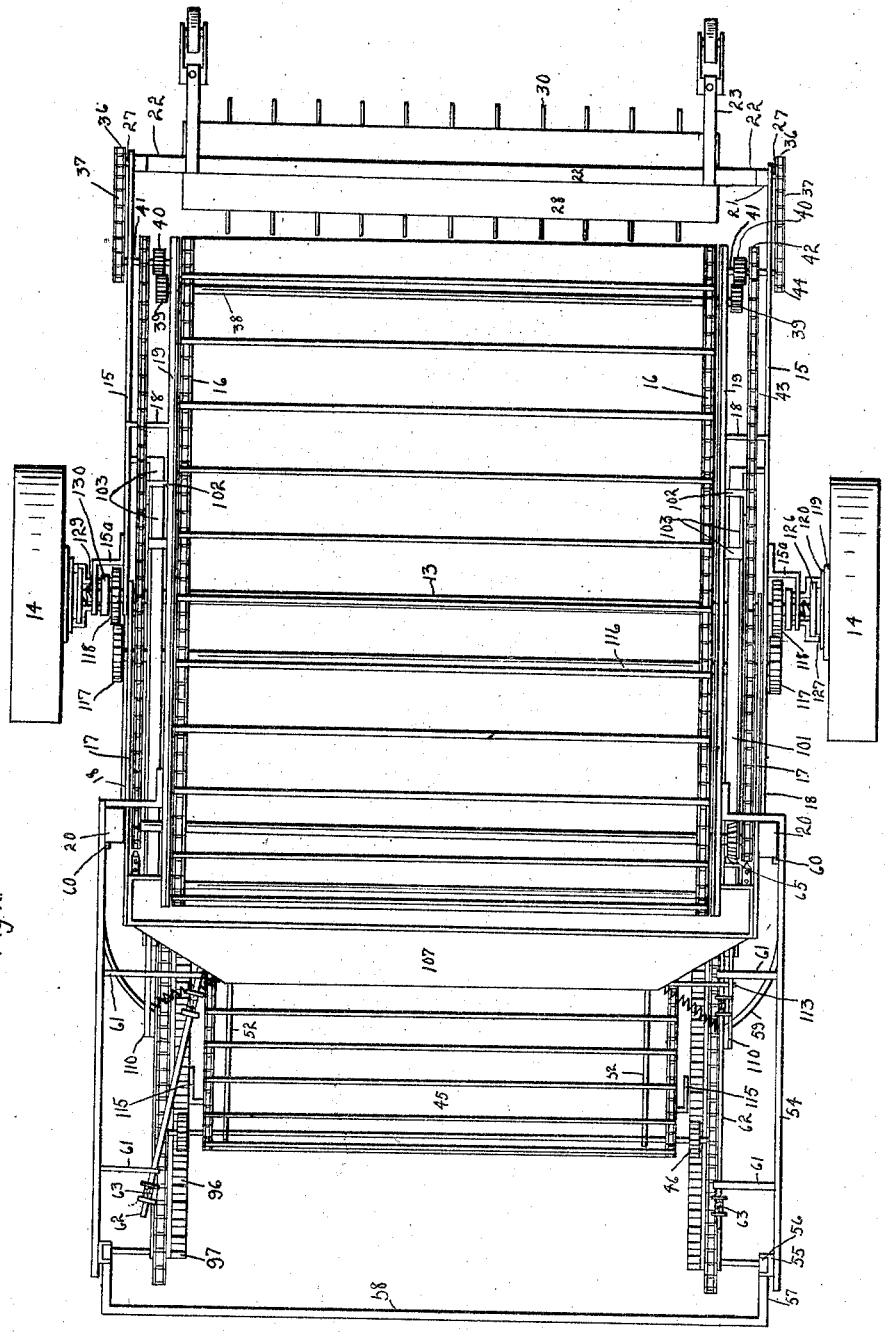
Fig. 2 shows a top or plan view of the hay loader.

Referring to the accompanying drawings, I have used the reference numeral 10 to indicate generally the bed of a hay rack having wheels 11 and a reach 12. The hay loader is supported on an axle 13, which carries the traction wheels 14. The axle 13 is journaled in frame members 15, which extend rearwardly toward the lower end of the elevating mechanism 16 and the rake apparatus. Upwardly and forwardly projecting frame members 17 support the forward end of the elevating mechanism and the distributing conveyer. Horizontal frame members 18 extend between the elevator supporting frame 19 and the vertical members 20, which are disposed substantially above the rear end of the bed 10. The members 18 are fixed to the supports 17, which also have their upper ends braced to the supports 20, so that a frame is provided, which has the well known strength of truss construction. The rear ends of the members 15 carry a pair of upwardly extending arms 21 to which is secured a cross brace 22. The cross brace 22 supports rearwardly extending arms 23 in which are screw threaded openings. These openings receive the screw threaded sleeves 24 in which are journaled shanks 25 of caster wheels 26.

From the construction of the foregoing parts it will be seen that the rear end of the frame members 15 may be elevated or lowered relatively to the ground by screwing the sleeve 24 downwardly or upwardly relative to the arms 23. Journaled in the supports 21 is a shaft 27 upon which is secured a drum 28. Journaled horizontally in the surface of the drum 28 are a plurality of shafts 29, which carry outwardly extending teeth 30, (Fig. 8).

Referring to Fig. 9 it will be seen that the teeth 30 are composed of resilient wire wrapped one or more times around the shaft 29, so that if these teeth strike a non-yielding obstruction, the coils formed at 31 may permit the end of the tooth to thereby pass over the obstruction without breaking the tooth. Each shaft 29 is provided with an inwardly extending arm 32, which has a pin 33 at the inner end thereof. The pin 33 travels in a cam groove 34 formed in a plate 35, which is supported within the drum 28 transversely of the longitudinal axis thereof.

Referring to Fig. 8, it will be seen that the teeth 30 project radially from the drum 28 during their movement adjacent to the ground but the cam groove 34 is so placed that as the teeth pass the lower end of the elevator 16 their outer ends are inclined backwardly relative to their path of travel, so that the hay, which they raise will fall off onto the lower end of the elevator. One end of the shaft 27 is provided with a sprocket 36, which may be connected with the chain 37 to drive the drum 28 from the traction wheels 14.

The elevating mechanism of the loader consists of a conveyer supported by the frame 19 in an upwardly and forwardly inclined position, so that the upper end of the conveyer projects forward from the frame member 20. The shaft 38 at the lower end of the elevator 16 has a pinion 39 secured thereto, which meshes with a pinion 40, which in turn is supported on a stub shaft 41. The stub shaft 41 also supports a sprocket 42 adapted to mesh with the main driving chain 43 whereby it may be driven from the traction wheels 14. A second sprocket 44 is secured to the stub shaft 41 and carries the chain 37 whereby the drum 28 may be driven.

From the foregoing it will be seen that if the chain 43 is revolved in the direction opposite that in which the traction wheels 14 revolve, then the pinions 40 and 39 will reverse the direction of travel of the chains 43 thereby causing the elevator 16 to travel in the same direction as do the wheels 14. The chain 37, however, will cause the shaft 27 and the drum 28 to be driven in the direction opposite that in which the traction wheels travel whereby the hay may be raked by the teeth 30 up onto the conveyer 16 and carried to the top of the loader.

In a loading device of this description it is desirable that the hay elevated from the ground should be evenly distributed over the bed of the hay rack and that the hay should fall but a very short distance from the loader to the rack, so that the wind will not blow it away or disturb the regularity of the load. It is also desirable that the distributing apparatus should not only distribute the hay to the various parts of the bed but it is also desirable to have the hay likewise distributed throughout the loading process. In order to accomplish this result I have provided a conveyer upon which the hay from the elevator 16 may fall at all times but which is arranged so that the distributing end of the conveyer may reciprocate longitudinally relative to the bed 10 whereby the hay falling off the end of the conveyer would be evenly distributed along the bed. In order that the distributing conveyer may operate at all times as well as reciprocate I have provided connections hereinafter described with the traction wheels 14.

I have also provided means for elevating the conveyer without interfering with its reciprocation and operation so that as the load becomes heaped up the conveyer may be correspondingly raised, so that the reciprocation thereof will not interfere with the loaded hay on the bed. This distributing conveyer is designated generally by the numeral 45 and is carried by pinions 46 and rollers 47. The pinions 46 are mounted on a shaft 48, which carries sprockets 49 upon which the conveyer is carried. The rollers 47 are carried upon a shaft 50 upon which are sprockets 51, which carry the rear end of the conveyer 45. Extending between the shafts 48 and 50 are longitudinal brace members 52 whereby the shafts are spaced their distance apart. The conveyer 45 is designed to be supported upon a pair of spaced parallel members, which we shall hereinafter call the power track whereby the conveyer may be evenly elevated or adjusted vertically. These members have been given generally the numeral 53 and the means for permitting adjustment will first be described.

A pair of spaced parallel arms 54 extend forwardly from the frame members 20 at a point spaced down from the upper end of the elevator 16. The forward ends of the members 54 carry guide members 55 in which are a pair of spaced vertical guide rods 56. The lower ends of the rods 56 are secured to the track members 53 at the forward end of the latter and then extend forwardly at 57 where they are connected by a cross member 58.

It will thus be seen that the forward ends of the tracks 53 may be vertically adjusted by the movement of the guide rods 56 in the guide members 55. A second guide member 59 is secured to the rear ends of the outer sides of each of the tracks 53 and is provided with spaced gripping fingers 60, which coact with the post 20 to guide the vertical reciprocation of the rear end of the tracks 53. A pair of spaced bearing members 61 project inwardly from each of the frame members 54 to receive the shafts 62 upon which are drums 63 (Fig. 12). The drums 63 carry cables 64, which have their free ends secured to the tracks 53 so that rotation of the shafts 62 will wind or unwind the cables 64 to thereby raise or lower the tracks 53. The rear ends of the shafts 62 carry bevel gears 65 by which they are rotated in the following manner:

A shaft 66 extends transversely between the frame members 20 adjacent to the frame members 54. This shaft is connected by means of sprockets 67 with the chain 43 so that the shafts 66 may be driven from the traction wheels 14 (Fig. 10). Mounted on the shafts 66 is a sleeve 68, which carries near its ends bevel gears 69. The gears 69 mesh with the pinions 65 on the shafts 62. Spaced downwardly from the shaft 66 a cross member 70 is secured upon which is mounted a shaft 71. Secured to the end of the sleeve 68 is a brake drum 72 and a ratchet wheel 73. An arm 74 projects upwardly from the member 70 and carries a dog 75 which is yieldingly held in engagement with the teeth of the ratchet 73 by means of spring 76. An arm 77 also projects upwardly from the member 70 and carries the stationary end of a brake band 78, which coacts with the brake drum 72. The movable end of the brake band 78 is secured to an arm 79, which is mounted on the shaft 71. An arm 80 secured to the shaft 71 carries a pin 81, which extends to position adjacent to the dog 75 so that it will throw the dog 75 out of engagement when the shaft 71 is moved to certain predetermined positions. The end of the sleeve 68 is provided with notches 82 adapted to coact with the teeth 83 formed at the end of the clutch member 84, which is slidably but non-rotatably mounted on the shaft 66. A collar 85 is loosely mounted on the shaft 66 next to the clutch member 84 and is permitted sliding but not rotatable movement by means of an arm 86, which projects from the frame member 20 into a slot 87 in said collar. The outer end of the collar 85 is provided with oneway teeth adapted to coact with similar teeth on a second collar 88. The collar 88 is rotatably but non-slidably mounted on the shaft 66 and is provided with an outwardly extending arm 89 having a pin 90 at the end thereof. The pin 90 is adapted to be received within the slot at the upper end of an arm 91 which is secured to the shaft 71.

A control rod 92 is pivoted to the arm 91 and may be extended to any desired position. A spring 93 is disposed in a slot in the shaft 66 and is adapted to bear against a pin 94, which is fixed in the collar 84.

From the construction of the parts just described, it will be seen that the sleeve 68 controls the rotation of the drums 63 and consequently the vertical adjustment of the conveyer 45. The sleeve 68 is, however, rotatably mounted upon the shaft 66 so that I have provided means for connecting it to the shaft to wind the drums 63 or to disconnect the sleeves 68 from the shaft 66, and to hold the sleeve from movement, and to prevent the conveyer 45 from falling and for retarding the revolution of the sleeve 68 to permit the conveyer 45 to be lowered slowly.

When it is desired to connect the shaft 66 with the sleeve 68 to raise the conveyer, revolution of the shaft 71 in one direction moves the arm 91, which in turn moves the arm 89, which in turn revolves the collar 88 when the action of the oneway teeth on the collars 88 and 85 cause the collar 85 to move inwardly on the shaft 66. Movement of the latter also moves the clutch member 84 against the pressure of the spring 93 to position where the teeth 83 engage the notches 82 of the sleeve 68 to thereby cause the sleeve 68 and the shaft 66 to revolve together. As soon as the control rod 92 is released, the action of the spring 93 will throw the parts back to position where the teeth 83 and notches 82 will be disengaged. During the winding movement of the sleeves 68 the dog 75 engages the teeth of the ratchet 73 and still does so after the winding movement ceases, so that the weight of the conveyer 45 will not cause the drums 65 to unwind and thereby revolve the sleeve 68.

When it is desired, however, to lower the conveyer 45 movement of the control rod 92 in the direction indicated by the arrow 95 (Fig. 11) causes the pin 81 to engage the pawl 75 thereby releasing it from the teeth of the ratchet 73 to permit the sleeve 68 to revolve in the proper direction. Continued movement in the same direction of the control rod 92 also moves the arm 79, which has secured to it the free end of the brake band 78 thereby tightening the brake band 78 around the brake drum 72 whereby the speed with which the conveyer descends may be regulated by the pressure on the control rod 92.

As has been before stated the conveyer consists of longitudinal spacing or brace members 52 supporting shafts 50 and 48 upon which are mounted sprockets 49 and 51, which carry the conveyer 45. In order to permit this distributing conveyer to reciprocate as a whole and at the same time travel on said sprockets, I have provided the power track members 53, which are spaced parallel strips of material supported in the manner described by the guides 59, guide rods 56 and ropes 64. The inner side of each member 53 is provided with inwardly projecting shoulders 96 upon which are teeth 97. At either end of either of the tracks 53 a sprocket wheel 98 is journaled. The sprocket wheels 98 carry chains 99, which run completely around the edges of the tracks 53 except along the bottom thereof where a groove 100 is formed in which the chain 99 travels. The shaft 48 of the conveyer 45 is extended outwardly at either end and connected to the chains 99, the parts being so arranged that movement of the chain 99 around the sprockets 98 causes the shaft 48 to travel with the chains 99 thereby causing the forward end of the conveyer to reciprocate from one end of the track members 53 to the other end thereof and then back.

In order to insure travel of the conveyer on its sprockets 48 and 50 during its reciprocation caused by the movement of the chain 99 the shaft 48 has the pinions 46, which have already been described and which coact with the teeth 97 of the shoulders 96 through the movement of the shaft 48 to cause the reciprocating movement of the shaft to rotate the conveyer. It will be noted that the ends of the shoulders 96 are properly curved, so that as the shaft 48 travels around the ends of the tracks 53 the teeth 97 will still coact with the teeth of the pinions 46 to cause the shaft 48 to revolve.

It will be seen that the reciprocation of the shaft 48 will cause the entire conveyer 45 to reciprocate and I have provided the following means to support the rear end of the conveyer, so that it may slide in unison with the movement of the forward end thereof. This means consists of a pair of spaced parallel tracks 101, which are pivoted at their forward ends to the track members 53 adjacent to the rear ends of the latter and have their rear ends slidingly supported by guides 102 on guide rod 103, the latter extending from the frame members 15 to the frame members 19. In this connection it may be mentioned that the track members 101 cannot be rigid extensions from the track members 53 as they would interfere with the elevator 16 while the conveyer 45 was in its upper positions. The tracks 101 are preferably composed of angle iron and carry the rollers 47, which are mounted upon the shafts 50 of the conveyer 45.

As it is thought best to have the conveyer reciprocate a distance of about twelve and one-half feet, so that it may distribute hay to practically all of the twelve feet of the rack body 10, the tracks 53 are made approximately twelve and one-half feet long in order that they may best be used with the length of the hay rack generally in use.

On account of the comparatively small space between the rear end of the track 53 and the bottom of the elevator 16 it is desirable that the conveyer 45 should be of considerably less length than the track 53, so that I have provided means for supporting the shaft 50 on the tracks 101 even though the shaft 50 is in position forward of the rear end of the tracks 53.

In order to accomplish this result it will be noted that the connection between the rollers 47 and the shaft 50 must be such that the roller 47 may still support the shaft 50 although the upper edge of the track 53 is between the two at the time the conveyer is in its forward position. I have shown the shaft 50 bent to form a U-shaped arch 104, which will extend above the chains 99 and the track 53 when the conveyer 45 is at its forward position.

It will thus be seen that the conveyer may move to its position shown in Fig. 1 from the position shown in Fig. 15 without the support for the shaft 50 interfering with the track 53.

From the description of the foregoing parts it will be seen that the conveyer has its forward shaft secured to a chain, which runs around the track 53 whereby the forward end of the conveyer will be reciprocated above the body 10 a distance equal to the length of the track 53 and the rear end of the conveyer is supported upon the track 101, which permits its reciprocation in harmony with that of the front end.

It will also be seen that through the reciprocation of the conveyer the coöperation of the pinions 46 with the teeth 97 will cause the conveyer to travel on the sprockets 48 and 50 at the same time that it is reciprocated. In order that the chain 99 may be continuously operated in any of the vertical positions of the conveyer 45 I have provided shaft 66, which extends between supports 20 adjacent to their upper ends and the shaft 105, which extends between the supports 20 and 18 adjacent to the lower ends of the former, these shafts carrying sprockets 67 and 106 respectively over which the chain 43 travels.

The shafts 98$^b$, which carry the sprockets 98 at the rear end of the track members 53 are extended outwardly and journaled in the guides 59 and carry a second pair of sprockets 98$^a$. These sprockets are in vertical alinement with the chain 43 and mesh therewith in all the vertical adjustments of the conveyer 45, so that movement of the chain 43 will actuate the conveyer 45 in any of its positions.

Adjacent to the upper end of the elevator 16 a flexible chute or casing 107 is secured, which is adapted to receive the hay from the upper end of the elevator. The lower end of the chute 107 hangs adjacent to the upper surface of the conveyer 45, so that all the hay received thereby from the elevator will pass downwardly to the surface of the conveyer 45. It will be noted that this chute 107 must be made collapsible and in the form shown it consists of canvas or other flexible fabric 108, which is reinforced at intervals by rigid hoops 109 (Fig. 12), so that the lower end of the chute 107 may be raised up when the conveyer 45 is raised without interfering substantially with the free passage of the hay through the chute.

As the conveyer when it is in its rearward position has its forward end disposed rearwardly of the rear end of the track 53 means are also provided for carrying the lower end of the chute 107 rearwardly during the rearward movement of the conveyer 45, so that it will still drop its contents on the conveyer although the latter be in its rearward position. This means consists of a guide arm 110 which is secured to the side of the track 53 at 111 and then projects upwardly therefrom, then rearwardly and horizontally. The arm 110 is provided with the slot 112 in which a pin 113 which projects from the lower end of the chute 107 is received. A spring 114 is secured to the bottom of the chute 107 and to any other suitable place on the machine to yieldingly hold the lower end of the chute 107 at the forward limit of its movement.

In order to carry the lower end of said chute rearwardly during the rearward movement of the conveyer an arm 115 is secured to the brace members 52 of the conveyer 45 and projects upwardly therefrom a sufficient distance so that when the shaft 48 is traveling either above or below the track 53 the arm 115 will still project up high enough to engage the pin 113. The arm 115 is secured to the member 52 at a place near the shaft 48 so that as the latter shaft travels rearwardly along the under side of the track 53 the arm 115 will engage the pin 113 thereby carrying it rearwardly along the slot 112 whereby the lower end 107 is also carried rearwardly. As soon as the shaft 48 reaches the rear end of the track 53 it then runs upwardly around the end of the track and starts forwardly along the upper side thereof. The spring 114 will hold the pin 113 against the arm 115 during this forward movement until the pin 113 reaches the forward end of the slot 112 where the chute will be held stationary until the arm 115 again engages the pin 113 on its next rearward trip.

The chain 43 is designed to be connected with the traction wheels 14 and the following mechanism has been evolved to accomplish this purpose. It will be understood that the traction wheels 14 must have some connection with the driving mechanism in the way of a differential in order that the loader may turn corners and yet secure the power from the traction of both the traction wheels on straight pulling.

It may also be noted in this connection that I have provided duplicate sets of chains for either side of the device, so that the power may be more evenly applied through the machine to thereby lessen the necessity for heavy bracing members while at the same time securing positive driving connections. It may also be noted that the elevator 16 must travel in the same direction as the traction wheels 14, the drum 28 must travel in the direction opposite that of the traction wheels and the chain where it drives the conveyer must also travel in a direction opposite that of the traction wheels.

It will be noted from the connections, which have heretofore been described that the chain 43 must travel upwardly between the sprockets 67 and 106 and the sprocket 42 is arranged so that when it travels in the direction which the chain thus moving would impart, it is operatively connected with the drum 28 and the elevator 16 so that they travel in the proper direction. This then means that the sprocket, which drives the chain 43 from the traction wheels 14 must revolve in the direction opposite that revolved by the traction wheels. In order to permit this result I provide a shaft 116, which extends between the uprights 17 adjacent to and parallel with the axle 13. The shaft 116 carries pinions 117, which mesh with the pinions 118 on the axle 13. It has been noted that the traction wheels 14 are rotatably mounted upon the axle so that I have provided a combined clutch and ratchet mechanism to operatively connect the traction wheels with the axle 13 to drive the latter.

The ratchet mechanism is designed to permit one wheel to rotate faster than the other while the power is being applied to the loader so that the device may turn corners. The ratchet mechanism consists of a hollow drum 119, which is secured to the spokes of the wheel 14. Rotatably mounted on the axle 13 is a combined ratchet support and clutch member 120. The exterior surface of the member 120 is provided with ears 121, which carry dogs 122, which are yieldingly held by springs 123 against teeth 124 on the interior surface of the drum 119. The inner portion of the member 120 is formed with a cone shaped recess adapted to form one half of a cone clutch device. Slidably but non-rotatably mounted on the axle 13 is the other half of the clutch device, which consists of a truncated cone member 125, which has an annular outwardly extending flange 126 at the inner end thereof.

A pair of fingers 127 are received in the annular groove between the flange 126 and the cone 125, these fingers being formed at the ends of rods 128, which are slidably received through the brackets 15ª which extend from frame members 15 of the loader. A spring 129 encircles the axle 13 between the flanges 126 and the members 15ª thereby yieldingly holding the cone 125 into the recess of the member 120. Secured to the inner ends of the rods 128 are plates 130, which may be connected by flexible devices 131, which are in turn connected to a single flexible device (not shown) whereby the forward pull on the single flexible device will pull the plates 130 inwardly against the resistance of the spring 129 thereby disengaging the clutch members 125 and 120 to throw the axle 13 out of gear. By the use of the drum 119 and the members 120 together with the ratchets 122 it will be seen that one wheel may rotate faster than the other although power is continuously applied to the loader by the moving wheels.

Pivoted to the frame of the loader is a forwardly extending member 133 by which it may be secured to the rear end of the reach 12 of the hay rack. Secured to the rear end of the reach 12 is a clevis 134. Secured to the forward end of the member 133 are a pair of forwardly extending plates 135, which have adjacent to their forward ends registering openings adapted to receive the bolt 136. Between the members 135 a spring 137 is mounted and adapted to yieldingly move forward a slide block 138. The slide block 138 has a forwardly projecting flange 139 at its upper edge, which limits the forward movement of the block 138 when it strikes a flange 140 at the forward end of the upper plate 135. A spring 141 yieldingly holds the member 133 in a substantially horizontal position.

In the operation of the parts just described the hay rack is backed up against the loader wherever it may be standing with the clevis 134 in position in longitudinal alinement with the member 133. The member 133 is then adjusted vertically so that the space between the plates 135 will receive the clevis 134, so that continued backing of the hay rack will cause the clevis 134 to push the slide bar 138 rearwardly against the pressure of the spring 137 until the extension 139 permits the bolt 136 to drop through the slot in the clevis 134. When it is desired to detach the rack from the loader the bolt 136 may, of course, be lifted upwardly when it will stand in its raised position to rest on the extension 139 and held from falling out by a guide 142.

In the practical operation of my improved hay loader a hay rack is backed up against the hitching bar 133 and secured thereto by means of the spring latch and the bolt and the device is then ready for operation by being pulled over the ground behind the hay rack.

The operation of the parts consists first in the revolution of the drum 28, which revolves so that the teeth 30 pick up hay and carry it up to position opposite the lower end of the elevator 16. When the teeth reach this position the cam 34 causes the teeth to be turned from a radial line to position where the hay will slide off from them during the further revolution of the drum 28. The hay received by the elevator 16 is carried from the drum 28 to the top thereof and dumped off into the flexible chute 107. It then falls down the chute 107 onto the conveyer 45 which reciprocates back and forth while at the same time revolving with its upper side traveling toward the forward end of the wagon. This compound movement of the conveyer 45 causes the hay received thereon to be distributed off the forward end of the conveyer onto the hay rack in what may be termed layers, which cover the hay rack bed.

As the hay upon the rack becomes piled up the entire power track 53 carrying with it the conveyer 45 may be raised up by means of the control rod 92 with its coöperating mechanism. It is, of course, understood that the control rod 95 is extended to any suitable place as perhaps at the end of the frame 54 and with a suitable lever provided with a notched sector should be used in order to hold the rod in its adjusted positions.

The operation of the parts connected with the control rod has already been described but it may be well to here mention that movement in one direction of the rod connects the sleeve 68 with the winding drums 63 whereby the conveyer 45 is lifted. When it is desired to lower the conveyer 45 as for instance when a loaded hay rack has been pulled away and a new one (or the same one after being emptied) has been attached to the loader, the control rod 95 is then moved in the opposite direction whereby the dog 75 is released from the ratchet wheel 73 to thereby permit the drum 63 to unwind and allow the conveyer 45 to fall. The downward movement of the conveyer is, however, limited by the movement of the control rod 95, which tightens the brake band 78 on the brake drum 72 to an extent depending upon the movement of the control rod 95.

After the loader has been attached to the hay rack and is being moved over the ground it will be seen that revolution of the traction wheels will normally cause the movement of the chain 43 between the sprockets 67 and 106 upward thereby rotating the sprocket 98. Revolution of the sprocket 98 causes the chain 99 to revolve thereby carrying the forward conveyer shaft 48 around the power track 53, which in turn causes the entire conveyer to reciprocate bodily from one end of the track to the other. The rear end of the conveyer is carried during this reciprocation on the rollers 47, which roll along the movable track 101.

It will be noted that when the conveyer 45 is in its lower positions the track 101 stands out in position slightly at an angle to the horizontal whereas when the conveyer 45 is raised the track 101 stands in position at more of an angle to the horizontal. As the upward movement of the conveyer 45 and the power track 53 is alined with the direction or line of movement of the chain 43 it will be seen that the rear sprockets 98 will be rotated by the chain 43 in all of their adjusted positions.

As has been heretofore noted the longitudinal brace members of the conveyer 45 carry the upright arm 115, which coacts with the pin 113 on the chute 107 so that as the conveyer moves rearwardly it carries the lower end of the chute 107 with it past the rear end of the track 53 thereby causing the chute 107 to drop onto the conveyer in any of its reciprocal positions. Upward movement of the track 53 and the conveyer 45 merely causes the fabric 108 of the chute 107 to fold in between the ribs 109 because the slot 112 carries the lower end of the chute upwardly with it when the conveyer 45 is moved upwardly.

When the operator desires for any reason to disconnect the loading mechanism from the traction wheels this may be accomplished by pulling on the flexible devices 131, which pull the clutch members 125 and 120 out of engagement thereby permitting the traction wheels to rotate independently of the loading mechanism. If it is found at any time that the teeth 30 do not travel a proper distance from the ground the sleeve 24 may be screwed upwardly or downwardly in the arms 23 to thereby adjust the height of the rear end of the frame members 15, which carry with the support the drum 28.

I claim as my invention:

1. In a device of the class described, a frame mounted on wheels, a distributing conveyer supported on said frame and designed to project over a wagon or the like, an elevating device on said frame adapted to discharge upon said distributing conveyer, means for reciprocating such conveyer forwardly and rearwardly and for permitting the rear end thereof to tilt during the rearward movement of such reciprocation, whereby the elevator will not interfere with the reciprocation of the conveyer.

2. In a device of the class described, a frame mounted on wheels, an elevating device thereon, inclined upwardly and forwardly from the rear portion of said frame, a distributing conveyer, means for mounting said conveyer for permitting the fore-and-aft reciprocation thereof, and the raising and lowering of said conveyer, said means being arranged to permit the rear end of the conveyer to tilt during its rearward movement, whereby the elevator will not interfere with the reciprocation and the raising and lowering of said conveyer.

3. In a device of the class described, a frame mounted on wheels, an elevating device thereon, inclined upwardly and forwardly from the rear portion of said frame, a distributing conveyer, means for mounting said conveyer for permitting the fore-and-aft reciprocation thereof, and the raising and lowering of said conveyer, said means being arranged to permit the rear end of the conveyer to tilt during its rearward movement, whereby the elevator will not interfere with the reciprocation and the raising and lowering of said conveyer, and a flexible chute operatively connected with said conveyer and adapted to receive material discharged from said elevator.

4. In a device of the class described, a wheel mounted frame, a pair of tracks mounted substantially in longitudinal alinement and pivoted together at their adjacent ends, means for slidingly supporting the rear end of the rear track rearwardly of the other track, means for supporting the forward track in horizontal position and for adjusting same vertically, and a conveyer mounted on said tracks adapted to reciprocate bodily thereon.

5. In a hay loader, a wheel mounted frame, a delivering conveyer mounted thereon adapted to simultaneously operate and to reciprocate in a horizontal plane, and means for vertically adjusting said conveyer, said means including power actuated means for elevating the conveyer and hand actuated means for retarding its descent.

6. In a hay loader, a wheel mounted frame, a track device mounted in a horizontal position thereon comprising an outer flange and an inner shoulder, said shoulder having a rack formed thereon, a sprocket wheel mounted at the ends of the outer flange, a chain adapted to run on said sprocket wheel and around the outer flange, a conveyer having a supporting shaft at either end thereof, the forward shaft being rotatably mounted in said chain, a pinion mounted on said forward shaft adapted to mesh with said rack, a second track disposed at the rear end of the first track and extending laterally therefrom, means for supporting the rear shaft of the conveyer on said second described track, and means for rotating said sprockets.

Des Moines, Iowa, October 5, 1917.

RUSSELL ENSIGN.

Copies of this patent may be obtained for five cents each, by addressing the "Commissioner of Patents, Washington, D. C."